Nov. 10, 1964 H. J. KUMP 3,156,784

MAGNETIC ERASER

Filed Jan. 30, 1961 2 Sheets-Sheet 1

INVENTOR
HERBERT J. KUMP
BY John S. Gasper
ATTORNEY

Nov. 10, 1964 H. J. KUMP 3,156,784

MAGNETIC ERASER

Filed Jan. 30, 1961

2 Sheets-Sheet 2

United States Patent Office 3,156,784

Patented Nov. 10, 1964

3,156,784

MAGNETIC ERASER

Herbert J. Kump, Endwell, N.Y., assignor to International Business Machines Corporation, New York, N.Y., a corporation of New York Filed Jan. 30, 1961, Ser. No. 85,807
6 Claims. (Cl. 179—100.2)

The present invention relates to magnetic recording and more particularly to a means for erasing a previously magnetized recording surface.

A present method for erasing magnetic records is to subject the record surface to a damped oscillating magnetic field. Present erase devices for practicing such an erasing technique generally require complex magnetic structure or relatively complex energizing circuitry and may require that the record surface be cycled through the magnetic field more than once. Accordingly, it is an object of the present invention to provide a magnetic eraser having erase elements which are simple in magneitc structure and which are simple to operate.

It is also an object of the present invention to provide such a device which will erase a record surface on a single pass thereof through the erase magnetic field.

It is a further object of this invention to provide a magnetic eraser device especially suited for erasing multiple track recordings on a record surface.

It is a still further object of this invention to provide a magnetic eraser suitable for erasing magnetic recordings of the type found in magnetic printing produced on a magnetic surface which takes the form of a magnetic drum or the like.

These and other objects are attained in accordance with the practice of the present invention by providing an erasing means in the form of a rotor member having a plurality of pole elements radially disposed and uniformly angularly spaced about a common axis of rotation. In the preferred embodiment, the pole elements are permanent magnets preferably of high coercive force materials such as Alnico. In an alternate embodiment, the pole elements are formed of iron core pole pieces wound with electric conductor elements which are series connected to a source of direct current. A feature of invention lies in the arrangement of pole elements or the energization of the pole pieces such that the corresponding ends thereof are of the same polarity.

Means is provided for supporting the rotor member proximate a movable recording surface to be erased. Means is also provided for rotating the rotor member in timed relation with the movement of the record surface. Thus, a magnetic eraser may be obtained which is particularly adapted for use on a multiple track record surface and which will require only a single pass of the record surface through the damped oscillating magnetic field. It will be appreciated that in this manner, a simplified magnetic erase means has been provided which does not require special magnetic structure, which is simple to operate, and which is readily adjustable to accommodate a variety of operating conditions for various types of magnetic recorders.

The foregoing and other objects, features and advantages of the invention will be apparent from the following more particular description of preferred embodiments of the invention, as illustrated in the accompanying drawings.

Figure 3:
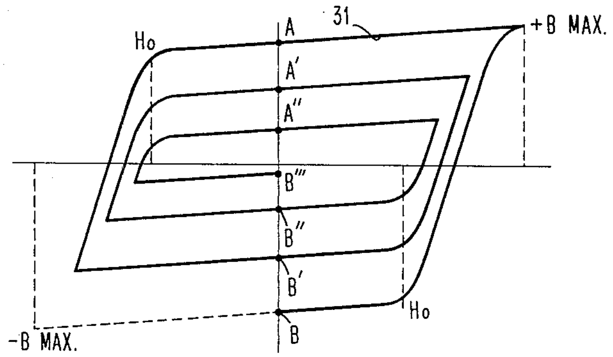
FIG. 3 shows a BH curve of successive hysteresis loops of a high coercive force material forming a part of the drum surface of FIG. 1.

In general the present invention relates to a magnetic eraser means which produces an A.C. magnetic erase. A magnetic surface has been A.C. erased when it has been left at a near zero remanent state. More specifically, an A.C. erase results when a record surface experiences decaying and alternating longitudinal and perpendicular magnetic field components of a magnitude sufficient to saturate the record surface as it moves relative to an erase means. As shown in FIG. 3, the decaying alternation of the magnetic field of the type shown in FIG. 4 results in the recording surface being carried through successively similar hysteresis loops.

Figure 1:
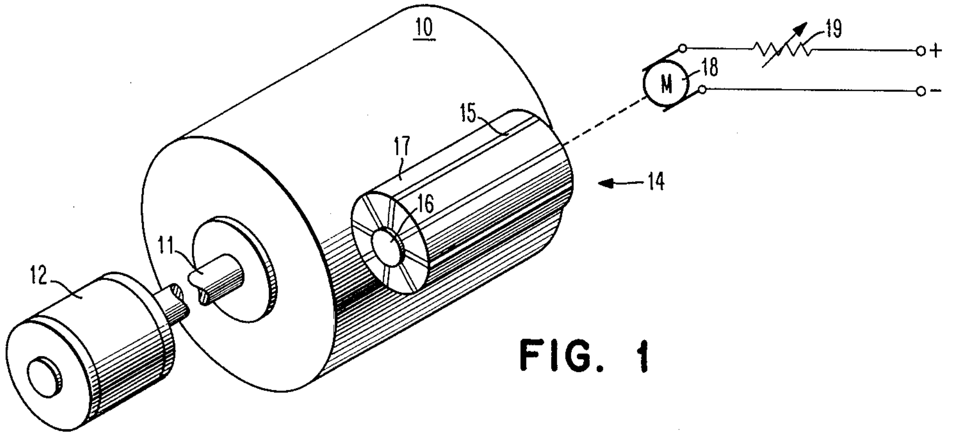
FIG. 1 shows a perspective view of a magnetic recording apparatus illustrating one embodiment of the present invention.

Referring to FIG. 1, there is shown a schematic drawing of a magnetic recording device which may be a magnetic printing apparatus of the type shown in U.S. Patent No. 2,820,956 of W. J. Rueger issued on January 21, 1958. Such apparatus includes a drum 10 mounted on a shaft 11 and motive means 12 connected to the shaft for rotating the same at a constant rate of speed. As is well known to persons skilled in magnetic recording arts, the outer surface of drum 10 is formed with a layer 13 of high coercive force magnetizable material such as an alloy of nickel and cobalt and the magnetic record is formed on the drum surface by one or more electromagnetic transducer heads (not shown) which are selectively pulsed during a period of relative motion of the surface and heads. In the particular application of magnetic printing as illustrated in the above-mentioned patent, the magnetic transducer heads are adapted to produce a mosaic magnetic image pattern on the drum surface, the elements of the image pattern being magnetic bits having conccentric polarity characteristics. The details of such magnetic recording and one type of such a transducer head useful therefor may be seen by reference to U.S. Patent No. 2,950,161 of W. J. Rueger, issued August 23, 1960. In magnetic printing, the magnetic images on drum surface layer 13 are developed by the application of minute magnetic particles thereto, the developed image is transferred to a print medium, and residual particles on the surface of layer 13 are brushed therefrom. In the interest of simplicity, the apparatus for the magnetic printing steps just referred to have been omitted. Following the cleaning operation in magnetic printing or at some suitable time in another form of magnetic recording, it may be desirable to erase the magnetic record possibly in preparation for producing a new magnetic record. In that event, the entire surface of the drum 10 is subjected to a damped oscillating magnetic field.

Figure 2:
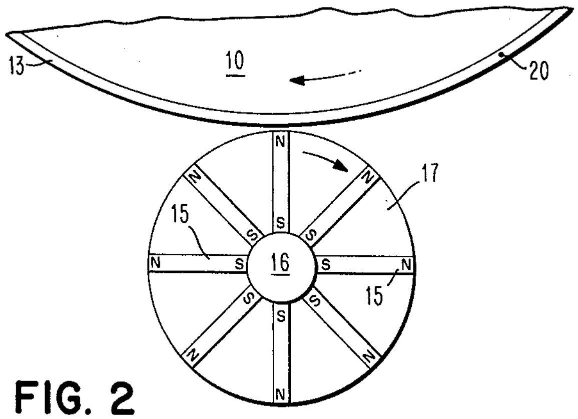
FIG. 2 is a detail of FIG. 1 showing a specific construction of a first embodiment of the present invention.

As shown in FIGS. 1 and 2, the erase function in accordance with present invention is performed by a rotor member 14 having a plurality of radial pole elements 15 uniformly angularly spaced about a rotatable shaft 16. In the embodiment of FIGS. 1 and 2, the pole elements 15 are permanent bar magnets embedded in a mold 17 of non-magnetic material such as plastic. In the preferred form, the shaft 16 is non-magnetic material such as non-magnetic stainless steel.

The rotor member 14 is mounted in any suitable manner so that the peripheral extremities of the pole elements 15 are maintained proximate the surface 13 of drum 10. To effectuate erasure, the rotor member 14 is rotated at a preselected speed in timed relation with the motion of the magnetic drum surface layer 13. For that purpose, the shaft 16 of rotor member is mechanically connected to a motive means such as electric motor 18 which may be connected electrically to a source of potential through a variable resistance 19 or the like so that the speed of rotation of rotor member 14 may be adjusted in accordance with the desired rate of alternation of the damped magnetic field.

As the drum 10 is rotated at a constant rate of travel, the rotor member 14 is rotated at a speed which may be determined in accordance with the following formulae:

$$Ve=\frac{f}{N}$$

where $Ve$=rotational velocity of erase rotor member 14.
$f$=frequency of alternation of the magnetic erase field.
$N$=number of poles of like polarity around the circumference of rotor member 14.

and $$f=\frac{V_D A}{2d}$$

where $V_D$=the drum 10 surface velocity.
$d$=linear distance over which the erase is effected.
$A$=the number of field alternations necessary so that remanent magnetization of layer 13 is negligible.

Figure 4:
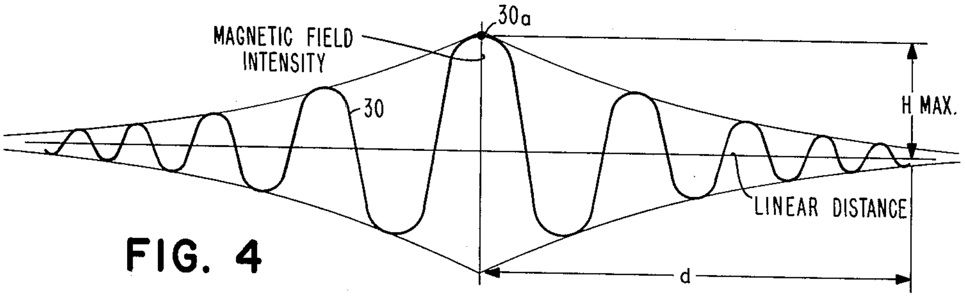
FIG. 4 is a curve illustrating the damped oscillating magnetic field which is experienced by a point on the record surface in its rotation.

The principle of operation of the magnetic erase of the rotor member 14 may be better understood by referring to FIGS. 3 and 4 taken in connection with the apparatus described in FIGS. 1 and 2. As a unit area 20 of layer 13 of drum 7 moves toward a location most proximate the rotor member 14 as drum 10 is rotated in clockwise direction (see FIG. 2), surface area 20 moves into a magnetic field generated by the rotor member 14. As shown by the left side of curve 30 in FIG. 4, unit surface 20 experiences a succession of magnetic field alternations of increasing intensity. At the position where unit surface 20 is closest the surface of rotor member 14, it will experience magnetization of maximum intensity as depicted by point 30*a* in FIG. 4. As the unit area 20 proceeds from the position closest to rotor member 14, it experiences a gradual decrease in the magnitude of the magnetic field as shown by the right side of the curve 30. At some point in the approach of unit surface 20 to the rotor member 14, the magnetic field generated by the rotor member 14 produces a saturable magnetization of that portion (and every other portion) of the surface. As the magnetic field continues to alternate, the magnetized surface has its magnetic state switched from a maximum to a minimum as illustrated in the hysteresis curve 31 of FIG. 3. As shown in that hysteresis curve, each alternation of the magnetic field being damped the reverse magnetization of the unit surface 20 is accomplished at a reduced level. By controlling the frequency of alternations of the magnetic field the magnetic state of unit surface 20 can be switched any number of times to a point where the remanent magnetization is substantially negligible.

In the preferred embodiment in which the present invention is practiced, the rotor member 14 has the pole elements 15 arranged so that the outer extremities are at the same polarity. This arrangement makes it possible to realize a high number of magnetic field alternations at lesser rotational speeds of the rotor member 14.

Figure 5:
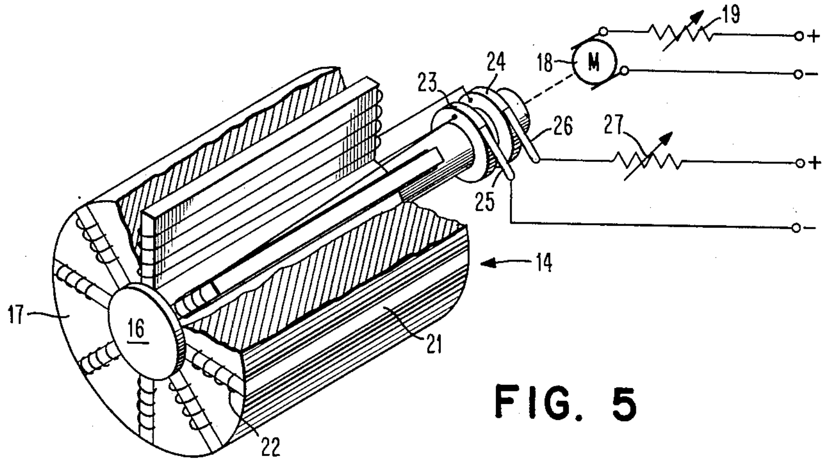
FIG. 5 is a second embodiment of a rotor member suitable as an erasing means for the present invention.
Figure 6:
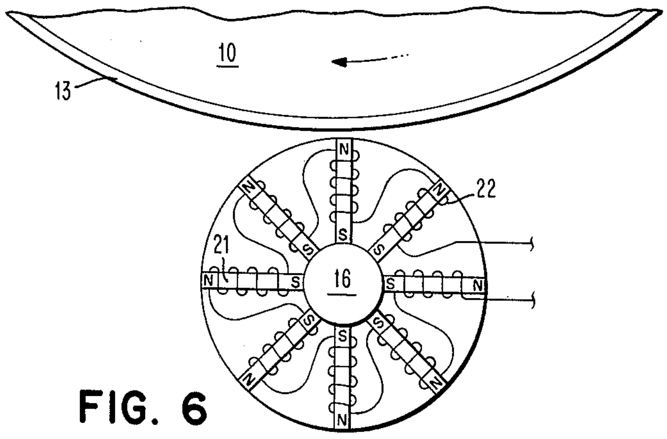
FIG. 6 is an end view of the rotor member of FIG. 5.

A second embodiment of a magnetic erase device may be seen by referring to FIGS. 5 and 6. In this embodiment the pole elements take the form of a plurality of pole pieces 21 of low remanent magnetic material. Coil elements 22 wound on each of the pole pieces 21 provide the means for polarizing the pole pieces. The arrangement of coils 22 on pole pieces 21 may take various forms which will occur to persons skilled in the magnetic structure art. To provide like polarities at the ends of the pole pieces 21, the coils 22 are series connected with each other and to an external source of electrical energy via slip rings 23 and 24 through brushes 25 and 26 respectively. A variable resistor 27 or the like is provided in series with brush 26 to afford adjustment of the current in the coils 22 so that the field intensity of members 21 may be controlled. As in the case of the rotor of FIG. 1, the rotor member 14 of FIG. 5 has a shaft 16 preferably of non-magnetic material which is mechanically connected to electric motor 18 which in turn is electrically connected to a variable resistor 19 or the like to an external power source.

Thus, there has been described an apparatus operable for erasing magnetic records under various operating conditions. The speed of rotation of rotor member 14 is readily adjustable to increase or decrease the number of alternations of the erase field. Also in the embodiment of FIGS. 5 and 6, the magnetic intensity of the field is readily adjustable to accommodate various operating conditions. While the description shows a magnetic record surface in the form of a drum, it will occur to persons skilled in the art that the magnetic eraser of the present invention is useful with record surface of different form such as a tape or the like.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic record eraser comprising in combination, a movable magnetic record of extended surface and means for subjecting said record surface to an alternating magnetic erase field, said means comprising rotor member having a plurality of radially disposed unidirectional flux producing pole elements arranged in uniformly spaced condition in a circumferential manner about the periphery of said rotor member, said rotor member being mounted with its peripheral surface proximate said magnetic record surface, and means for rotating said rotor member in timed relation with the movement of said record surface whereby said pole elements subject successive increments of said magnetic surface while in motion to an alternating damped magnetic field variation.

2. A magnetic record eraser in accordance with claim 1 in which said pole elements are permanent magnets.

3. A magnetic record eraser in accordance with claim 1 in which the pole elements comprise iron pole pieces and energizing coils thereon, said coils being electrically connected in a series circuit adapted for connection to a direct current energizing source.

4. A magnetic eraser in accordance with claim 1 in which all of the pole elements are arranged so that corresponding extremities are of the same polarity.

5. A magnetic eraser in accordance with claim 3 in which said coils are wound on said pole pieces so as to produce like polarity pole pieces on energization by said current source.

6. A magnetic eraser in accordance with claim 1 in which said means for rotating said rotor member in timed relation with the movement of said record surface includes means for rotating said rotor member in a direction opposite to the direction of motion of the magnetic record.

References Cited in the file of this patent

UNITED STATES PATENTS

| | | |
|---|---|---|
| 1,828,190 | Kiliani | Oct. 20, 1931 |
| 2,306,584 | Zuschlag | Dec. 29, 1942 |
| 2,722,617 | Cluwen et al. | Nov. 1, 1955 |